United States Patent
Lin et al.

(10) Patent No.: US 11,518,953 B2
(45) Date of Patent: Dec. 6, 2022

(54) LITHIUM-BASED GREASE AND PREPARATION METHOD THEREOF

(71) Applicant: Guangxi LiuGong Machinery Co., Ltd., Guangxi (CN)

(72) Inventors: Bo Lin, Liuzhou (CN); Jinqiong Luo, Liuzhou (CN); Hao Liang, Liuzhou (CN); Li Zhang, Liuzhou (CN); Mingzhi Lin, Liuzhou (CN); Guoqing Hou, Liuzhou (CN)

(73) Assignee: Guangxi LiuGong Machinery Co., Ltd., Guangxi (CN)

( * ) Notice: Subject to any disclaimer, the term of this patent is extended or adjusted under 35 U.S.C. 154(b) by 0 days.

(21) Appl. No.: 17/431,773

(22) PCT Filed: Feb. 25, 2020

(86) PCT No.: PCT/CN2020/076674
§ 371 (c)(1),
(2) Date: Aug. 18, 2021

(87) PCT Pub. No.: WO2020/173447
PCT Pub. Date: Sep. 3, 2020

(65) Prior Publication Data
US 2022/0089963 A1  Mar. 24, 2022

(30) Foreign Application Priority Data
Feb. 25, 2019  (CN) .......................... 201910139410.7

(51) Int. Cl.
*C10M 169/04*  (2006.01)
*C10M 103/04*  (2006.01)
(Continued)

(52) U.S. Cl.
CPC ........ *C10M 103/04* (2013.01); *C10M 125/02* (2013.01); *C10M 177/00* (2013.01);
(Continued)

(58) Field of Classification Search
CPC .............. C10M 103/04; C10M 125/02; C10M 177/00; C10M 2201/042; C10M 2201/041;
(Continued)

(56) References Cited

U.S. PATENT DOCUMENTS

2011/0306527 A1\* 12/2011 Bouffet ................ C10M 169/06
508/182
2014/0342955 A1\* 11/2014 Wu ....................... C10M 125/02
508/122

FOREIGN PATENT DOCUMENTS

CN  104560264 A  4/2015
CN  104560289 A  4/2015
(Continued)

OTHER PUBLICATIONS

Chen Yanjun et al. "Preparation and Electrochemical Properties of Graphene Modified by Quaternary Ammonium Chitosan," Acta Polymerica Sinica, No. 9, Sep. 30, 2015 (Sep. 30, 2015), pp. 1087-1088, Section 2.2.

*Primary Examiner* — Prem C Singh
*Assistant Examiner* — Francis C Campanell
(74) *Attorney, Agent, or Firm* — Young Basile Hanlon & MacFarlane, P.C.

(57) ABSTRACT

A lithium-based grease and the preparation method thereof are provided. The raw materials for preparing the lithium-based grease include in parts by weight: 75-88 parts of base oil, 0.5-2.5 parts of antiwear agent, 0.1-1.5 parts of antirust agent, 0.1-1.5 parts of antioxidant, 5-25 parts of lubricant, 5-15 parts of thickening agent, and 0.6-2.0 parts of saponifying agent. The raw materials also include hydroxyl compound-containing modified graphene containing quaternary ammonium salt or aromatic ring. The grease has good colloid stability and mechanical stability, can greatly improve the antiwear property. More than that, the grease has excellent oxidation resistance, and can significantly (Continued)

shorten the reaction time of the saponification, reduce the reaction temperature of the saponification.

7 Claims, 2 Drawing Sheets

(51) Int. Cl.
    *C10M 125/02*     (2006.01)
    *C10M 177/00*     (2006.01)
    *C10N 30/00*     (2006.01)
    *C10N 10/02*     (2006.01)
    *C10N 30/06*     (2006.01)
    *C10N 30/10*     (2006.01)
    *C10N 50/10*     (2006.01)

(52) U.S. Cl.
    CPC ... *C10M 2201/042* (2013.01); *C10N 2010/02* (2013.01); *C10N 2030/06* (2013.01); *C10N 2030/10* (2013.01); *C10N 2030/24* (2020.05); *C10N 2050/10* (2013.01)

(58) Field of Classification Search
    CPC ...... C10M 2201/062; C10M 2201/065; C10M 2201/066; C10M 2203/102; C10M 2207/026; C10M 2207/125; C10M 2207/1285; C10M 2213/062; C10M 2215/064; C10M 2219/022; C10M 2219/044; C10M 2219/068; C10M 2223/045; C10M 2223/047; C10M 2227/066; C10N 2010/02; C10N 2030/06; C10N 2030/10; C10N 2030/24; C10N 2050/10; C10N 2030/26; C10N 2060/00; C10N 2070/00
    USPC ....................................................... 508/113
    See application file for complete search history.

(56) References Cited

FOREIGN PATENT DOCUMENTS

| | | |
|---|---|---|
| CN | 106118826 A | 11/2016 |
| CN | 106221863 A | 12/2016 |
| CN | 108587755 A | 9/2018 |
| CN | 109810748 A | 5/2019 |

* cited by examiner

LITHIUM-BASED GREASE AND PREPARATION METHOD THEREOF

CROSS-REFERENCE TO RELATED APPLICATION(S)

This application is a national stage 371 application of PCT/CN2020/076674, filed Feb. 25, 2020, which claims priority to Chinese Application No. 201910139410.7, filed Feb. 25, 2019, the entire disclosures of which are incorporated by reference.

FIELD

The present invention relates to a lubricating oil, and in particular to a lithium-based grease and preparation method thereof.

BACKGROUND

Lubricant plays an extremely important role in industrial production. It can reduce friction, thereby reducing unnecessary energy loss and protecting machinery to prolong its service life. Lithium-based grease is a mainstream grease with good mechanical stability, good colloid stability and excellent water resistance. Herein, it is an objective to provide a lithium-based grease.

Graphene is a new material with a single-layer lamellar structure composed of carbon atoms, and is currently the thinnest but hardest nano material in the world. The thermal conductivity of graphene is as high as 5300 W/m K, which is higher than those of a carbon nanotube and a diamond, while its resistivity is lower than that of copper or silver, making it the material with the lowest resistivity in the world. A graphene material is a carbon nano-material which is formed by stacking graphene and has no more than 10 layers. It has great application potential in the fields of electronics, aerospace, ocean engineering equipment, national defense technology and the like. A large number of researches on tribological properties of the graphene material show that the graphene material has excellent lubricating and antiwear properties, so that the graphene material has become a potential high-performance lubricating material. The key problems of applying the graphene material to the lithium-based grease are: first, solving the problem of a composite effect between the graphene material and the base oil and additives in the grease; and second, solving the problem that the grease is continuously oxidized and decayed in the use process, and the generated peroxides and oxidized condensates have an antagonistic effect on the graphene material; and third, the most critical problems are the uniform dispersion of the graphene material in the grease and the compatibility among the existing dispersant, the base oil and the additives.

Thus, it is necessary to explore and develop a graphene-containing grease by improving formulations and process methods to enhance the friction reducing performance, extreme-pressure antiwear performance and oxidation resistance of the original lithium-based grease.

SUMMARY

In order to solve the above technical problems, in one aspect, the present invention provides a lithium-based grease, wherein the raw materials for preparing the lithium-based grease include in parts by weight the following:

75-88 parts of base oil, 0.5-2.5 parts of antiwear agent, 0.1-1.5 parts of antirust agent, 0.1-1.5 parts of antioxidant, 5-25 parts of lubricant, 5-15 parts of thickening agent, and 0.6-2.0 parts of saponifying agent.

The inventors of the present application found that the combination of the anti-wear agent and a graphene material synergistically improves the anti-wear effect, and also contributes to a denser fiber structure. Leading to a grease having higher dropping point, better oxidation resistance and weather resistance. Thus, the invention also relates to a graphene-containing grease.

As a preferred technical solution, the raw materials for preparing the lithium-based grease further include in parts by weight: 0.001-1.5 parts of graphene material.

Advantageously, the combination of the graphene material and the anti-wear agent in the lithium-based grease synergistically improves the anti-wear effect as described above.

As a preferred technical solution, the raw materials for preparing the lithium-based grease further include in parts by weight: 0.001-1.5 parts of modified graphene.

As a preferred technical solution, the modified graphene is a hydroxyl compound-containing modified graphene.

As a preferred technical solution, the hydroxyl compound-containing modified graphene is a hydroxyl compound-containing modified graphene containing a quaternary ammonium salt.

As a preferred technical solution, the hydroxyl compound-containing modified graphene is a hydroxyl compound-containing modified graphene containing an aromatic ring.

As a preferred technical solution, the hydroxyl compound-containing modified graphene containing an aromatic ring is a phenol-modified graphene.

As a preferred technical solution, the antiwear agent is selected from at least one of zinc dialkyldithiophosphate, molybdenum dithiodialkylcarbamate, lead dithiodialkylcarbamate, triphenyl thiophosphate, organomolybdenum complex, sulfurized olefin, molybdenum disulfide, polytetrafluoroethylene, molybdenum thiophosphate, chlorinated paraffin, antimony dibutyldithiocarbamate, tungsten disulfide, selenium disulfide, graphite fluoride, calcium carbonate and zinc oxide.

In another aspect, the present invention further provides a method for preparing the hydroxyl compound-containing modified graphene, characterized in that, the method comprises the steps of:

(1) contacting a carbon source with concentrated sulfuric acid (having a mass fraction of 95%-98%), wherein the carbon source preferably having a carbon content greater than 95%;

(2) adding a metal peroxide to the mixture obtained from step (1), preferably an alkali earth metal peroxide $X_2O_2$, wherein X is Li, Na, K or Rb or an alkaline earth metal peroxide $YO_2$, wherein Y is Ca, Ba, Mg or Sr, at a temperature of 0-10° C.;

(3) separating the solid fraction obtained from step (2) from the liquid phase;

(4) heating the dried solid fraction obtained from step (3) in an inert gas atmosphere to a constant temperature of 280 to 350° C., preferably of about 300° C. to obtain a hydroxylated graphene;

(5) reacting the hydroxylated graphene of step (4) with 2-hydroxyphenyl[3-(trimethoxysilyl)propoxy]phenyl ketone to obtain a modified hydroxylated graphene;

(6) reacting the modified hydroxylated graphene of step (5) with chloroalkyl ether to chloromethylate the modified hydroxylated graphene to obtain a chloromethylated modified hydroxylated graphene; and (7) reacting the chloromethylated modified hydroxylated graphene of step (6) with N(C$_{1-4}$alkyl)$_3$ to carry out a quaternization reaction.

In order to stop the reaction of step (2) water is added to the mixture after a certain amount of time has passed (chemical quenching). The water is added slowly, preferably stepwise over a certain period time.

Preferably the weight ratio of water that is added to the reaction mixture of step (2) is relative to the mass of the carbon source ranges from about 150:1 to about 70:1.

In order to carry out a saponification reaction the mixture containing the carbon source, the concentrated sulfuric acid, the metal peroxide is performed at a temperature of 80-95° C. for 0.2-1.5 hours.

Preferably the carbon source having a carbon content greater than 95% described in the step (1) is carbon black, crystalline carbon, amorphous carbon or a combination thereof. A preferred example for crystalline carbon is crystalline flake graphite (small flakes of graphite) with a particle size greater than 400 mesh.

Preferably the weight ratio of the carbon source to the concentrated sulfuric acid is in a range of from 1:50 to 1:90, more preferably in a range of from 1:60 to 1:80.

Preferably the weight ratio of the carbon source to the metal peroxide is in a range of from 4:1 to 1:1, more preferably in a range of from 2:1 to 1:1 based on the weight of the carbon source.

The skilled person is aware that it is advantageous stirring the mixture of step (2) uniformly for at least 1 h, more preferably for at least 2 h.

The solid fraction obtained from step (2) can be separated from the liquid phase via various methods, e.g., via centrifugation, sedimentation or filtration. For example, the mixture of step (2), containing the solid fraction can be centrifuged at 7,200 rpm for more than 0.5 h to realize solid-liquid separation.

The separated product obtained can be washed with water to remove excess of sulfuric acid and metal peroxide as well as byproducts.

Preferably the separated solid fraction is then dried at a low temperature below room temperature (below 25° C.), preferably at a temperature of 0-10° C. until the water content is less than 1%. The thus obtained dried solid fraction can be sieved, e.g., through a 400-mesh sieve, to obtain a screen underflow as graphene oxide powder.

The inert gas atmosphere according to step (4) can be provided by introducing an inert gas, preferably helium, nitrogen, argon or xenon or mixed gas thereof into a constant temperature chamber until air is exhausted from the whole space of the constant temperature chamber. More preferably the inert gas is helium, nitrogen or a mixture thereof.

Advantageously, the constant temperature chamber is first heated to a constant temperature of 280 to 350° C., preferably of about 300° C., before introducing the graphene oxide obtained from step (2) into the chamber and performing heat treatment to obtain a hydroxylated graphene.

Preferably, the modification of the hydroxylated graphene of step (5) can be performed in a polar solvent. Herein the polar solvent is selected form water and lower alcohols (in particular C$_1$ to C$_4$ alcohols), preferably methanol, ethanol, and propanol (n-propanol and i-propanol), 1-butanol, 2-butanol, and t-butanol. For example, the polar solvent is ethanol, water or a mixture thereof.

The thus obtained modified hydroxylated graphene can be isolated from the reaction mixture via various methods, e.g., via centrifugation, sedimentation or filtration. Preferably, the obtained modified hydroxylated graphene is isolated from the reaction mixture via suction filtering and washed with water. Advantageously, the processing is performed so that volatile solvent residues as well as byproducts are removed to yield a high-quality modified hydroxylated graphene.

Preferably the isolated modified hydroxylated graphene is dried under vacuum or under an inert gas atmosphere.

The chloroalkyl ether as the chloromethylation reagent can be dichloromethyl methyl ether, chloromethyl methyl ether, bis(chloromethyl) ether, 1,4-dichloromethoxybutane, 1,4-dichloro methyl butyl ether or tert-butyl chloromethyl ether. Preferably, the chloroalkyl ether is 1,4-dichloromethoxybutane.

The chloromethylated modified hydroxylated graphene obtained from step (6) can be reacted with a N(C$_{1-4}$ alkyl)$_3$, preferably triethylamine in a reactor to carry out a quaternization reaction. A preferred solvent for the quaternization reaction is halogen organic solvent such as dichloromethane, chloroform, carbon tetrachloride, 1,2-dichloroethane. Preferably the halogen organic solvent is chloroform.

The quaternization reaction can be carried out at a constant temperature of 50° C. to 70° C.

After the end of the reaction the thus obtained quarternized amino functional product can be washed with an organic solvent to remove volatile solvent residues as well as byproducts. Examples of the organic solvent include alcohols such as methanol (MeOH), ethanol (EtOH), 1-propanol, 2-propanol (iPrOH), 1-butanol, 2-butanol, and t-butanol; ketones such as acetone and methyl ethyl ketone; ethers such as diethyl ether, methyl tertiary butyl ether (MTBE), tetrahydrofuran (THF), dioxane and 1,4-dioxane. According to one preferred embodiment the obtained quarternized amino functional product is washed with 1,4-dioxane, ethanol or a mixture thereof.

The person skilled in the art knows that the obtained quarternized amino functional product can be dried under vacuum to obtain a hydroxyl-compound-modified graphene.

For example, the method for preparing the hydroxyl compound-containing modified graphene comprises the steps of S01. adding flake graphite powder into concentrated sulfuric acid; adding sodium peroxide and sodium nitrate respectively, and stirring uniformly; then adding water, stirring, centrifuging, washing with water, drying at a low temperature, and sieving to obtain a screen underflow as graphene oxide powder; introducing a mixed gas of helium and nitrogen into a constant temperature chamber until air is exhausted from the whole space of the constant temperature chamber, then heating to 300° C. until the temperature is constant, introducing the graphene oxide powder into the chamber, and performing heat treatment to obtain a hydroxylated graphene;

S02. adding the hydroxylated graphene of S01 and 2-hydroxyphenyl[3-(trimethoxysilyl)propoxy]phenyl ketone into a solvent ethanol, and adding water, reacting for 24 hours, suction filtering, washing, drying under vacuum to obtain a modified hydroxylated graphene;

S03. reacting the modified hydroxylated graphene prepared by S02 with 1,4-dichloromethoxybutane, to chloromethylate the resultant modified hydroxylated graphene to obtain a chloromethylated modified hydroxylated graphene; and S04. adding 1-2 g of the chloromethylated modified hydroxylated graphene into a reactor, then adding 30 mL of a solvent chloroform and 5 mL of triethylamine to carry out a quaternization reaction; after the end of the reaction, washing a product successively with 1,4-dioxane and ethanol, and drying under vacuum to obtain a hydroxyl-compound-modified graphene.

In another aspect, the present invention also provides a method for preparing the lithium-based grease, the method includes the steps of:
(1) mixing a base oil with a thickening agent, and heating-up to 80-105° C., so as to obtain a mixture;
(2) mixing a saponifying agent with water uniformly to obtain an aqueous solution, with the weight ratio of the saponifying agent to water being in a range of from 1:4 to 1:6;
(3) adding the aforementioned aqueous solution into the mixture of step (1) to carry out a saponification reaction at a temperature of 80-95° C. for 0.2-1.5 hours, heating-up to 190-220° C. after the reaction;
(4) cooling to 100-120° C., adding an antiwear agent, an antirust agent, an antioxidant and a lubricant; and
(5) pouring the product obtained from step (3) into a stainless-steel cup, cooling to room temperature, and grinding to obtain the lithium-based grease.

Preferably, only a part of base oil is mixed with a thickening agent in step (1) and the rest of the base oil is added to the mixture when the mixture is heat-up to 190-220° C. after the saponification reaction in step (3). Herein, the weight ratio of the part of the base oil to the rest of the base oil is in a range of from 1:1 to 5:1. Preferably the weight ratio of the part of the base oil to the rest of the base oil was 3:1.

Preferably in step (1) the base oil and the thickening agent is heated-up to about 100° C.

Preferably the weight ratio of the saponifying agent to water in step (2) being about 1:5.

The grinding to obtain the lithium-based grease is preferably performed with a three-roller machine.

The graphene-containing grease can be obtained by adding the graphene material (as defined herein) in step (3) while adding an antiwear agent, an antirust agent, an antioxidant and a lubricant. Among them, preferably the graphene material is first dispersed into an antiwear agent or small amount of base oil and is added to the base oil. It may be provided that the graphene material is dispersed into the antiwear agent or small amount of base oil by stirring or grinding and is added as homogenized fluid. The dispersion can be achieved by ultrasonic treatment (e.g., with an ultrasonic frequency of 30 kHz) for at least 30 min.

The graphene material can be a two-dimensional (2D) graphene materials, three-dimensional (3D) graphene materials and their derivatives made of graphene alone; modified graphene as defined herein, preferably a hydroxyl compound-containing modified graphene.

For example, the method for preparing the lithium-based grease comprises the steps of
(1) mixing a part of base oil with a thickening agent, and heating-up to 80-105° C., so as to obtain a mixture;
(2) mixing a saponifying agent with water uniformly to obtain an aqueous solution, with the weight ratio of the saponifying agent to water being in a range of from 1:4 to 1:6 means (1:(4-6));
(3) adding the aforementioned aqueous solution into the mixture of step (1) to carry out a saponification reaction at a temperature of 80-95° C. for 0.2-1.5 hours, heating-up to 190-220° C. after the reaction, adding the rest of the base oil, cooling to 100-120° C., adding an antiwear agent, an antirust agent, an antioxidant and a lubricant; and
(4) pouring the product obtained from step (3) into a stainless-steel cup, cooling to room temperature, and grinding with a three-roller machine to obtain the lithium-based grease;
wherein, the weight ratio of the part of the base oil to the rest of the base oil is in a range of from 1:1 to 5:1 (means (1-5):1).

Compared with the prior art, the present invention has the beneficial effects that: the lithium-based grease of the present invention has the advantages of the traditional lithium-based grease, such as good colloid stability, excellent mechanical stability, and a long service life, and the like, and greatly improves the antiwear property of the lithium-based grease. More than that, the present invention has excellent oxidation resistance, and can significantly shorten the time of a saponification reaction, reduce the temperature of the saponification reaction, greatly improve the invariability, stability and antiwear property of a basic lithium-based grease, and thus enable it to be competent for rigorous working conditions such as high temperature, high speed, high load and wateriness.

DETAILED DESCRIPTION

The present disclosure can be more easily understood with reference to the following detailed description of preferred embodiments of the present invention and examples included therein. Unless otherwise defined, all technical and scientific terms used herein have the same meaning as commonly understood by those of ordinary skills in the art to which the present invention belongs. In case of contradiction, the definition in the specification will control.

For the purpose of the following detailed description, it should be understood that, the present invention may employ various alternative variations and step orders, unless clearly indicated to the contrary. Furthermore, all numbers expressing quantities of ingredients used in, for example, the specification and claims should be understood to be modified by the term "about" in all cases except any operating example or unless otherwise indicated. Therefore, unless indicated to the contrary, the numerical parameters set forth in the following specification and the appended claims are approximations that vary depending on the desired properties to be obtained by the present invention. At the very least, it is not intended to limit the application of the doctrine of equivalents to the scope of the claims. Each numerical parameter should at least be interpreted according to the number of reported significant numbers and by applying ordinary rounding techniques.

Although the numerical ranges and parameters setting forth the broad scope of the present invention are approximations, the numerical values listed in the specific examples are reported as accurately as possible. However, any numerical value inherently contains certain errors necessarily resulting from standard deviations found in their respective test measurements.

When a numerical range is disclosed herein, the above range is considered continuous, and includes the minimum and maximum values of the range and each value between such minimum and maximum values. Further, when the range refers to integers, every integer between the minimum value and the maximum value of the range is included. Furthermore, when multiple ranges are provided to describe features or characteristics, the ranges may be combined. In other words, unless otherwise specified, all ranges disclosed herein should be understood to include any and all subranges subsumed therein. For example, a specified range of "1 to 10" should be considered to include any and all subranges between the minimum value of 1 and the maximum value of 10. Exemplary subranges of the range of 1 to 10 include, but are not limited to, 1 to 6.1, 3.5 to 7.8, 5.5 to 10, etc.

In one aspect, the present invention provides a lithium-based grease, the raw materials for preparing the lithium-based grease include:

75-88 parts of base oil, 0.5-2.5 parts of antiwear agent, 0.1-1.5 parts of antirust agent, 0.1-1.5 parts of antioxidant, 5-25 parts of lubricant, 5-15 parts of thickening agent, and 0.6-2.0 parts of saponifying agent.

As a preferred technical solution, the raw materials for preparing the lithium-based grease further include in parts by weight: 0.001-1.5 parts of graphene material.

As a preferred technical solution, the raw materials for preparing the lithium-based grease further include in parts by weight: 0.001-1.5 parts of modified graphene.

Graphene Material

Typical examples of graphene materials as used herein are two-dimensional (2D) graphene materials, three-dimensional (3D) graphene materials and their derivatives made of graphene alone or closely stacked, with no more than 10 layers. Graphene materials include single-layer graphene, double-layer graphene, and multi-layer graphene. The macroscopic forms of graphene materials are thin films, powders, pastes, and three-dimensional (3D) structures. 3D graphene material is a (all-carbon) framework with a hierarchical porous structure.

In general, graphene material can be obtained by exfoliation, hydrothermal self-assembly, hydrothermal reduction of graphene oxide, chemical vapor deposition, nanotube slicing, carbon dioxide reduction, spin coating, supersonic spray, laser treatment of organic polymer films, microwave-assisted oxidation, and ion implantation.

Typical examples of modified graphene as used herein are hydroxyl compound-containing modified graphene, hydroxyl compound-containing modified graphene containing a quaternary ammonium salt, hydroxyl compound-containing modified graphene containing an aromatic ring and sulfonated graphene (e.g., long-chain carbon-modified sulfonated graphene). In particular, the modified graphene materials explicitly mentioned herein showed excellent anti-wear performance.

In the present application, a preferred method for preparing the graphene material is as follows (For the definition of individual parameters reference is made to the description herein):

(1) contacting a carbon source with concentrated sulfuric acid (having a mass fraction of 95%-98%), wherein the carbon source having carbon content greater than 95%;
(2) adding a metal peroxide to the mixture obtained after step (1), preferably an alkali earth metal peroxide $X_2O_2$, wherein X is Li, Na, K or Rb or an alkaline earth metal peroxide $YO_2$, wherein Y is Ca, Ba, Mg or Sr, at a temperature of 0-10° C.;
(3) adding water to the mixture obtained in step (2) at a temperature controlled at 80-95° C.;
(4) separating the solid fraction obtained from step (3) from the liquid phase;
(5) adjusting the pH value of the separated solid fraction to a pH value of greater than 6.0, preferably greater than 6.5,
(6) providing a water solution of dispersed graphene oxide;
(7) adding hydrazine hydrate (e.g. with a mass concentration of at least 85%), wherein functional groups of the graphene oxide are efficiently removed.

Preferably the carbon source having carbon content greater than 95% described in the step (1) is carbon black, crystalline carbon, amorphous carbon or a combination thereof. A preferred example for crystalline carbon is crystalline flake graphite (small flakes of graphite) with a particle size greater than 400 mesh.

Adjusting the pH value of the separated solid fraction according to step (5) can be obtained by washing the separated solid fraction with water. The skilled person is familiar with various methods for determining the pH value.

Optionally, the product obtained from step (5) is dried.

Preferably a water solution of dispersed graphene oxide in step (6) can be achieved by ultrasonic treatment (e.g., with an ultrasonic frequency of 30 kHz) for at least 30 min.

For example, the method for preparing the graphene material comprises the steps of:

S01. 1 kg of flake graphite powder (with a particle size greater than 400 mesh, and a carbon content greater than 95%) is added into 70 kg of concentrated sulfuric acid (with a mass fraction of 95%-98%); then respectively added with 0.5 kg of sodium peroxide and 0.5 kg of sodium nitrate based on 1 kg of the flake graphite powder at 0-10° C., and stirred for 2 h; slowly added with 100 kg of water based on 1 kg of the flake graphite powder at a temperature controlled at 80-95° C., and stirred for 1 h; centrifuged at 7,200 rpm for more than 0.5 h to realize solid-liquid separation; washed with warm water at 50-60° C., as long as the pH value of the water after washing is greater than 6.5; dried at a low temperature of 0-10° C. until the water content is less than 1%, and then sieved through a 400-mesh sieve to obtain the screen underflow as graphene oxide.

0.1 g of the graphene oxide prepared above is added into 100 ml of water for ultrasonic dispersion (with a ultrasonic frequency of 30 kHz) for 30 min, then added into 5 ml of hydrazine hydrate (with a mass concentration of 85%), heated in an oil bath at 100° C. and reacted for 24 h, and the finally obtained black flocculent precipitate is washed with water, suction-filtered and dried to obtain powder as the graphene material.

However, the skilled person knows that there are other ways to produce graphene.

The inventor of the present invention has found that the combination of the 3D graphene material and the anti-wear agent not only synergistically improves the anti-wear effect, but also contributes to a denser fiber structure. Leading to higher dropping point, better oxidation resistance and weather resistance.

In the present application, another preferred method for preparing graphene material, preferably a three-dimensional (3D) graphene material is as follows:

(1) sensitizing a polymer, wherein the sensitizing treatment comprises:
dispersing the polymer in an alkaline solution, preferably in an aqueous solution containing an alkali earth metal hydroxide XOH, wherein X is Li, Na, K or Rb or an alkaline earth metal hydroxide $Y(OH)_2$, wherein Y is Ca, Ba, Mg or Sr, wherein the alkali earth metal hydroxide or the alkaline earth metal hydroxide is in a molar concentration ranging from 2.5 to 10 M, more preferably ranging from 5 to 7.5 M;
dispersing the polymer in an acidic solution, preferably in an aqueous solution containing an hydrogen halogen HX, wherein X is F, Cl, Br or I, wherein the hydrogen halogen in the acidic solution is in a molar concentration ranging from 2.5 to 10 M, more preferably ranging from 5 to 7.5 M;

dispersing the polymer obtained after the alkalization treatment and the acidification treatment in an aqueous metal ion salt solution, wherein the aqueous metal ion salt solution having a concentration of 0.02 to 2 mol/L;

pore-forming treatment on the source material polymer obtained after the alkalization treatment and the acidification;

(2) drying the sensitized raw material obtained in step (1);
(3) performing high-temperature pyrolysis treatment on the dried raw material obtained from step (2);
(4) in a solvent, performing disintegration treatment on the sample following the high-temperature pyrolysis treatment in step (3);
(5) performing metal recovery treatment on the sample following disintegration in step (4).

Preferably, the polymer described in the step (1) is one or a mixture of one or more of an ion exchange resin, a phenol resin or an epoxy resin, and the ion exchange resin, the phenol resin and the like are specifically hydrogen type. And free amine type models.

Ion-exchange resins or ion-exchange polymers act as a medium for ion exchange. They comprise of an insoluble matrix (or support structure) normally in the form of small (0.25-0.5 mm radius) microbeads fabricated from an organic polymer substrate. The beads are typically porous, providing a large surface area on and inside them. There are multiple types of ion-exchange resin. Most commercial resins are made of polystyrene sulfonate.

Most typical ion-exchange resins are based on crosslinked polystyrene. The actual ion-exchanging sites are introduced after the polymerization. Additionally, in the case of polystyrene, crosslinking is introduced by copolymerization of styrene and a few percent of divinylbenzene. Typical examples of ion exchange resins are selected from the group consisting of sodium polystyrene sulfonate or polyAMPS, polyAPTAC), polyethylene amine.

Preferably, in the metal ion exchange described in the step (1), the metal ion salt solution is mixed with the polymer obtained after the alkalization treatment and the acidification treatment, and the metal ion salt solution is a metal ion. The salt is dissolved in water, preferably in deionized water to prepare a metal ion salt solution having a concentration of 0.02 to 2 mol/L.

Preferably, the above metal ion salt is one or more of an iron salt, a cobalt salt or a nickel salt.

Preferably, the iron salt is ferric chloride, ferrous chloride, iron sulfate, ferrous sulfate, iron nitrate, ferrous nitrate, iron acetate, ferrous acetate, potassium ferrocyanide, potassium ferricyanide, or sub one or more mixtures of sodium ferricyanide or sodium ferricyanide.

Preferably, the above cobalt salt is cobalt chloride, cobalt chloride, cobalt sulfate, cobaltous cobalt sulfate, cobalt nitrate, cobaltous cobalt nitrate, cobalt acetate, cobaltous cobalt acetate, sodium hexanitrocobaltate or hexanitroamide. One or more mixtures of potassium cobaltate.

Preferably, the above nickel salt is one or more mixtures of nickel chloride, nickel sulfate, nickel nitrate or nickel acetate.

Preferably, the metal ion salt and the polymer are used in a ratio of 0.002 to 0.4 mol of the metal ion salt:1 g of the polymer.

Preferably, the metal ion salt and the polymer are used in a ratio of 0.02 to 0.2 mol of metal ion salt:1 g of a polymer.

Preferably, the pore forming treatment in the step (1) is a pore forming of the polymer after the alkalizing treatment, the acidification treatment, and the metal ion exchange using the pore former solution, and the pore former is a pore former. Dissolved in a solvent to form a saturated pore former solution.

Preferably, the pore former is a alkali earth metal hydroxide XOH, wherein X is Li, Na, K or Rb or an alkaline earth metal hydroxide $Y(OH)_2$, wherein Y is Ca, Ba, Mg or Sr or an alkali earth metal oxide $X_2O$, wherein X is Li, Na, K or Rb or an alkaline earth metal oxide YO, wherein Y is Ca, Ba, Mg or Sr. Preferably, the hydroxide is potassium hydroxide or sodium hydroxide, and the oxide is potassium oxide or sodium oxide.

Preferably, the drying temperature described in step (2) is below 100° C. The product obtained from step (2) is dried to a moisture content of less than 2%.

Preferably, the pyrolysis treatment described in step (3) is a treatment at a pyrolysis temperature of less than 900° C. for 5-8 hours.

Preferably, the disintegrant described in the step (4) is one or a mixture of water and alcohol. Examples of alcohols include methanol (MeOH), ethanol (EtOH), 1-propanol, 2-propanol (iPrOH), 1-butanol, 2-butanol, and t-butanol.

Compared with the prior art, the present invention has the following beneficial effects:

The three-dimensional graphene powder production technology of the present invention has the following advantages:

(1) The whole process of preparing the three-dimensional structure graphene powder material does not require grinding and pulverization, optimizes the cumbersome preparation process in the process of preparing graphene by the conventional catalytic cracking method, simplifies the production process, and reduces the production cost.

(2) The graphitized carbon material can be freely disintegrated in water, alcohol or a mixture of the two, and can obtain a uniform structure and non-agglomerated three-dimensional structure graphene powder material without subsequent grinding; the method of the invention The prepared three-dimensional structure graphene powder has the advantages of high specific surface area, high electrical conductivity, low cost, simple preparation process, greatly shortened flow, easy scale and industrial production.

Modified Graphene

In the present application, as a preferred technical solution, the modified graphene is a hydroxyl compound-containing modified graphene; the hydroxyl compound-containing modified graphene is a hydroxyl compound-containing modified graphene containing a quaternary ammonium salt; as a preferred technical solution, the hydroxyl compound-containing modified graphene is a hydroxyl compound-containing modified graphene containing an aromatic ring; and as a preferred technical solution, the hydroxyl compound-containing modified graphene containing an aromatic ring is a phenol-modified graphene.

A method for preparing the modified graphene is as follows:

S01. 1 kg of flake graphite powder (with a particle size greater than 400 mesh, and a carbon content greater than 95%) is added into 70 kg of concentrated sulfuric acid (with a mass fraction of 95%-98%); then respectively added with 0.5 kg of sodium peroxide and 0.5 kg of sodium nitrate based on 1 kg of the flake graphite powder at 0-10° C., and stirred for 2 h; slowly added with 100 kg of water based on 1 kg of the flake graphite powder at a temperature controlled at 80-95° C., and stirred for 1 h; centrifuged at 7,200 rpm for more than 0.5 h to realize solid-liquid separation; washed with warm water at 50-60° C., as long as the pH value of the water after washing is greater than 6.5; dried at a low temperature of 0-10° C. until the water content is less than 1%, and then sieved through a 400-mesh sieve to obtain the screen underflow as graphene oxide powder. A mixed gas composed of helium and nitrogen at a volume ratio of 1:1 is flowed through the constant temperature chamber for 30 min until air is exhausted from the whole space of the constant temperature chamber, then heated-up to 300° C. until the temperature is constant, the graphene oxide powder is introduced into the chamber, and subjected to heat treatment for 50 min to obtain a hydroxylated graphene;

S02. 30 g of the hydroxylated graphene and 10 g of 2-hydroxyphenyl[3-(trimethoxysilyl)propoxy]phenyl ketone (CAS No.: 94279-22-8) are added into a solvent ethanol, and added with a small amount of water to react for at 50° C. for 24 h, suction-filtered, washed, dried under vacuum to obtain a modified hydroxylated graphene;

S03. the modified hydroxylated graphene prepared by S02 is reacted with 1,4-dichloromethoxybutane, to chloromethylate the resultant modified hydroxylated graphene to obtain a chloromethylated modified hydroxylated graphene; and S04. 1 g of the chloromethylated modified hydroxylated graphene is added into a reactor, then added with 30 mL of a solvent chloroform and 5 mL of triethylamine to carry out a quaternization reaction at a constant temperature (60° C.). After the end of the reaction, a product is washed successively with 1,4-dioxane and ethanol, and dried under vacuum to obtain a hydroxyl-compound-modified graphene.

The inventor has found that the hydroxyl-compound-modified graphene in the present application can not only effectively prevent the agglomeration of the graphene, but also significantly improve the oxidation resistance and antiwear property of the grease. More than that, the inventor has unexpectedly discovered that, the hydroxyl-compound-modified graphene in the present application can shorten the time of a saponification reaction and reduce the temperature of the saponification reaction of the lithium-based grease, and meanwhile can greatly improve the invariability, stability and antiwear property of the basic lithium-based grease. The inventor speculates that the possible reason is that on one hand the quaternary ammonium salt in the hydroxyl-compound-containing modified graphene prepared by the present application provides larger steric hindrance, which prevents the graphene material from being agglomerated and improves the antiwear property. On the other hand, the quaternary ammonium salt can be used as a phase transfer catalyst. The positive electrons of the quaternary ammonium salt continuously carry hydroxyl anions into an organic phase, which greatly reduces the temperature and time of the saponification reaction, and meanwhile the quaternary ammonium salt can provide alkalinity, reduce the presence of free alkali, and can greatly improve the invariability, stability and antiwear property of the basic lithium-based grease. Phenol can be used as a radical scavenger, and meanwhile the greater steric hindrance of the quaternary ammonium salt can slow down the next transfer of free radicals, reduce the oxidation of the grease by the free radicals, greatly reduce the generation of acidic substances, and improve the oxidation resistance and storage time of the grease.

Base Oil

Base oils are commonly used to produce lubricants, such as lubricating oils for automotive, industrial lubricants and lubricating greases. They are also used as process oils, white oils and metal working oils. The American Petroleum Institute (API) base oils classification is shown in Table below. Today, API Group III and IV base oils are used in high-quality lubricants.

| API base oil classification | | | |
|---|---|---|---|
| Group | Saturated hydrocarbons, wt-% (ASTM D 2007) | Sulfur, wt-% (ASTM D 1552/ D 2622/D 3120/ D 4294/D 4927) | Viscosity index (VI) (ASTM D 2270) |
| I | <90 | >0.03 | 80 ≤ VI < 120 |
| II | ≥90 | ≤0.03 | 80 ≤ VI < 120 |
| III | ≥90 | ≤0.03 | ≥120 |
| IV | All poly-alpha-olefins (PAO) | | 125 ≤ VI < 200 |
| V | All other base oils not belonging to Group I, II, III or IV | | |

Group I base oils are the most common type used for industrial oils, although increasingly more Group II base oils are being used, Group II base oils are still are commonly used in automotive engine oil formulations. Oils of the Group III are base oils with very high viscosity indices (VHVI) produced by modern methods from crude oil by hydrocracking, followed by isomerization of the waxy linear paraffins to give branched paraffins. Oils of Group III also include base oils produced from Slack Wax (SW) paraffins from mineral oils. Future products, not yet available, made from waxes (GTL waxes) obtained by Fischer-Tropsch (FT) synthesis for instance from coal or natural gas using corresponding isomerization techniques may in future belong in this group as well. Oils of Group IV are synthetic polyalphaolefins (PAO). Group V base oils comprise all base oils not included in Groups I, II, III or IV. Therefore, naphthenic base oils, various synthetic esters, polyalkylene glycols (PAGs), phosphate esters and others fall into this group. Ester base oils belonging in Group V are produced from fatty acids and alcohols. Said fatty acids are either natural or synthetic mono- or dicarboxylic acids. Depending on the ester to be produced, the alcohol is a polyol or a monohydroxylic alcohol. Ester base oils are typically monoesters, diesters, polyol esters or dimer esters. A similar classification is also used by ATIEL (Association Technique de l'Industrie Europeenne des Lubrifiants, or Technical Association of the European Lubricants Industry), said classification also comprising Group VI: Polyinternalolefins (PIO). In addition to the official classification, also Group 11+ is commonly used in this field, this group comprising saturated and sulfur-free base oils having viscosity indices of more than 110, but below 120. In these classifications saturated hydrocarbons include paraffinic and naphthenic compounds, but not aromatics.

Antiwear Agent

In the present application, the antiwear agent is selected from at least one of zinc dialkyldithiophosphate, molybdenum dithiodialkylcarbamate, lead dithiodialkylcarbamate, triphenyl thiophosphate, organomolybdenum complex, sulfurized olefin, molybdenum disulfide, polytetrafluoroethylene, molybdenum thiophosphate, chlorinated paraffin, antimony dibutyldithiocarbamate, tungsten disulfide, selenium disulfide, graphite fluoride, calcium carbonate and zinc oxide; and as a preferred technical solution, in the present application, the antiwear agent is zinc dialkyldithiophosphate.

The inventor has discovered that, when the antiwear agent in the present application is zinc dialkyldithiophosphate, the antiwear property of the lithium-based grease containing the hydroxyl-compound-modified graphene can be significantly improved; and more than that, the inventor has unexpectedly discovered that, in the present application, when the zinc dialkyldithiophosphate and the hydroxyl-compound-containing modified graphene are compounded, they can improve the oxidation resistance of the lithium-based grease synergistically. The inventor speculates that the possible reason is that, the hydroxyl-compound-containing modified graphene in the present application can be used as a hydrogen donor to promote the decomposition of peroxides by zinc dialkyldithiophosphate and thus further improve the oxidation resistance of the grease.

Antioxygen

In the present application, the antioxidant is selected from at least one of alkyl diphenylamine, 2,6-di-tert-butyl-p-cresol and di-iso-octyldiphenylamine; and as a preferred technical solution, in the present application, the antioxidant is a composition of 2,6-di-tert-butyl-p-cresol and alkyl diphenylamine at a corresponding weight ratio of 2:(1-5), preferably 2:3.

Lubricant

In the present application, the lubricant is selected from at least one of methyl oleate, boron nitride and polytetrafluoroethylene; and as a preferred technical solution, the lubricant is methyl oleate.

Antirust Agent

In the present application, the antirust agent is selected from any one of calcium petroleum sulfonate, calcium isooctanoate and zinc isooctanoate; and as a preferred technical solution, the antirust agent is calcium petroleum sulfonate.

In the present application, the thickening agent is not particularly limited, and is preferably dodecahydroxyl stearic acid. The saponifying agent is not particularly limited, and is preferably lithium hydroxide monohydrate.

In the present invention, the base oil is not particularly limited, and is preferably purchased from Huizhou Branch of Guangdong Zhong Hai Nan Lian chemical company, with the Model of 500SN.

The present invention will be described in detail below by way of examples. It should be pointed out here that, the following examples are only for further explanation of the present invention, and should not be construed as limiting the protection scope of the present invention. Some non-essential improvements and adjustments made by those skilled in the art according to the aforementioned content of the present invention still fall within the protection scope of the present invention.

Furthermore, unless otherwise specified, all the raw materials as used are commercially available. For example, the base oil can be purchased from Huizhou Branch of Guangdong Zhong Hai Nan Lian chemical company, with the Model of 500SN; dodecahydroxyl stearic acid (CAS NO. 106-14-9) can be purchased from Guangzhou Zhenwei Chemicals CO., Ltd; dialkyldithiophosphate (CAS NO. 68649-42-3) can be purchased from Shenzhen Hongtai Petroleum Additives Co., Ltd with the Model of T202; 2,6-di-tert-butyl-p-cresol (CAS NO. 128-37-0) and alkyl diphenylamine (CAS NO. 26603-23-6) can be purchased from Shenzhen Hongtai Petroleum Additives Co., Ltd with Models of T501 and L57, respectively; methyl oleate (CAS NO. 112-62-9) can be purchased from Suzhou Fengbei Bio-Tech Co., Ltd with the Model of 1070; calcium petroleum sulfonate (CAS NO. 26264-06-2) can be purchased from Shenzhen Hongtai Petroleum Additives Co., Ltd with the Model of T106; and lithium hydroxide monohydrate can be purchased from Shenzhen Hongtai Petroleum Additives Co., Ltd with the CAS NO. 1310-66-3.

Chlorinated paraffin can be purchased from Shenzhen Hongtai Petroleum Additive Co., Ltd., with the CAS No. 63449-39-8.

In the following, the present invention will be illustrated in detail by reference to the following examples, which set forth certain embodiments.

DRAWINGS

The figures show exemplary test results.
It shows.

EXAMPLES

Example 1

Figure 1:
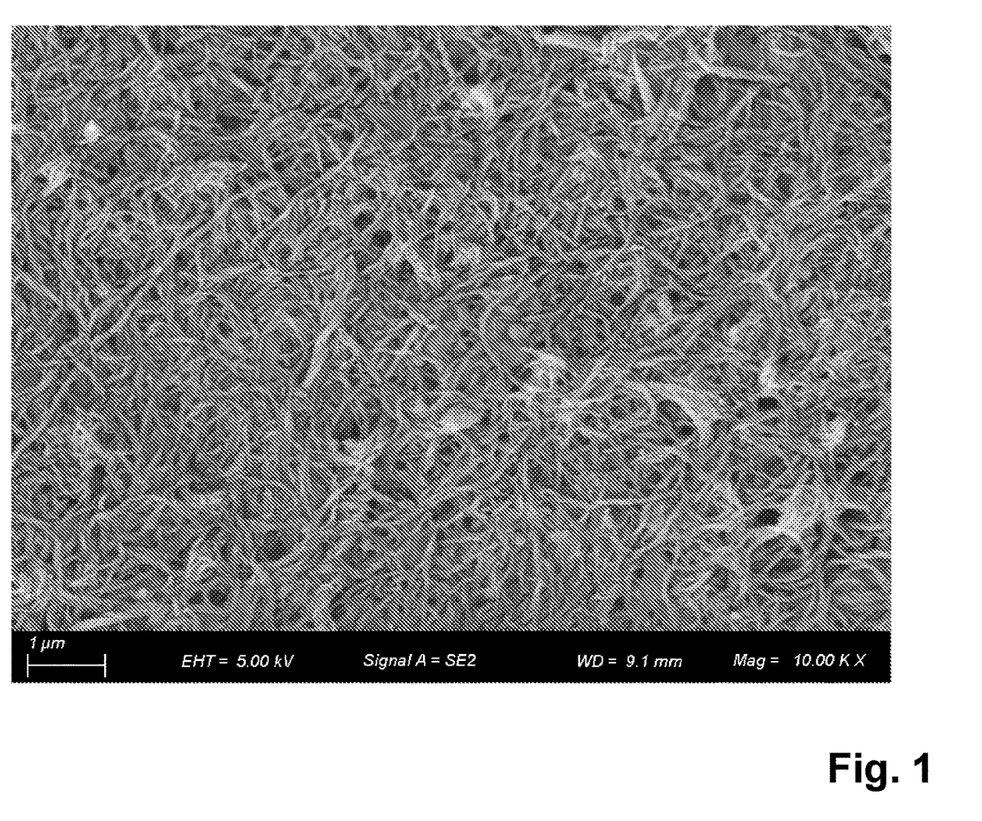
FIG. 1 is a scanning electron micrograph (SEM image) of a three-dimensional fiber structure graphene material prepared according to Example 12 of the present invention.
Figure 2:
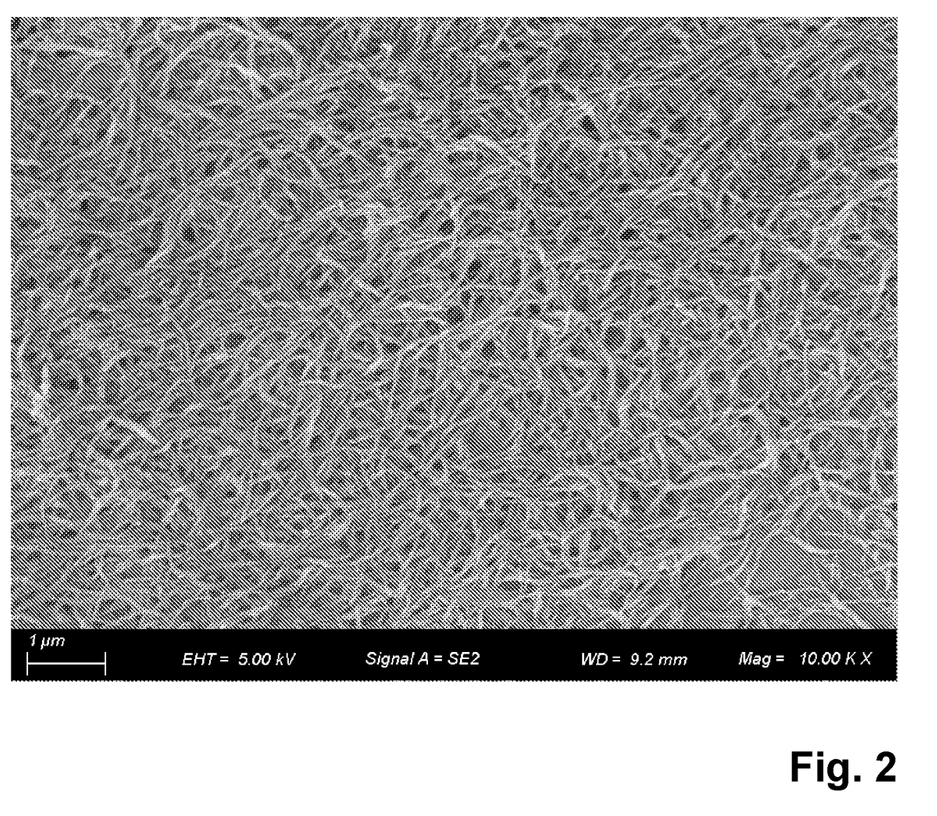
FIG. 2 is a scanning electron micrograph (SEM image) of a three-dimensional fiber structure graphene material prepared according to Example 13 of the present invention.

Example 1 provided a lithium-based grease, and the raw materials for preparing the lithium-based grease included: 0.5 parts of hydroxyl-compound-containing modified graphene, 80 parts of base oil, 0.5 parts of antiwear agent, 1.2 parts of antirust agent, 0.8 parts of antioxidant, 18 parts of lubricant, 10 parts of thickening agent and 1.4 parts of saponifying agent.

The method for preparing the hydroxyl-compound-containing modified graphene was as follows:

S01. 1 kg of flake graphite powder (with a particle size greater than 400 mesh, and a carbon content greater than 95%) was added into 70 kg of concentrated sulfuric acid (with a mass fraction of 95%-98%); then respectively added with 0.5 kg of sodium peroxide and 0.5 kg of sodium nitrate based on 1 kg of the flake graphite powder at 0-10° C., and stirred for 2 h; slowly added with 100 kg of water based on 1 kg of the flake graphite powder at a temperature controlled at 80-95° C., and stirred for 1 h; centrifuged at 7,200 rpm for more than 0.5 h to realize solid-liquid separation; washed with warm water at 50-60° C., as long as the pH value of the water after washing was greater than 6.5; dried at a low temperature of 0-10° C. until the water content was less than 1%, and then sieved through a 400-mesh sieve to obtain the screen underflow as graphene oxide powder. A mixed gas composed of helium and nitrogen at a volume ratio of 1:1 was flowed through the constant temperature chamber for 30 min until air was exhausted from the whole space of the constant temperature chamber, then heated to 300° C. until the temperature was constant, the graphene oxide powder was introduced into the chamber, and subjected to heat treatment for 50 min to obtain a hydroxylated graphene;

S02. 30 g of the hydroxylated graphene and 10 g of 2-hydroxyphenyl[3-(trimethoxysilyl)propoxy]phenyl ketone (CAS No.: 94279-22-8) were added into a solvent ethanol, and added with a small amount of water to react for at 50° C. for 24 h, suction-filtered, washed, dried under vacuum to obtain a modified hydroxylated graphene;

S03. the modified hydroxylated graphene prepared by S02 was reacted with 1,4-dichloromethoxybutane, to chloromethylate the resultant modified hydroxylated graphene to obtain a chloromethylated modified hydroxylated graphene; and S04. 1 g of the chloromethylated modified hydroxylated graphene was added into a reactor, then added with 30 mL of a solvent chloroform and 5 mL of triethylamine to carry out a quaternization reaction at a constant temperature (60° C.). After the end of the reaction, a product was washed successively with 1,4-dioxane and ethanol, and dried under vacuum to obtain a hydroxyl-compound-modified graphene.

The antiwear agent was zinc dialkyldithiophosphate; the antioxidant was a composition of 2,6-di-tert-butyl-p-cresol and alkyl diphenylamine at a corresponding weight ratio of 2:3; the lubricant was methyl oleate; the antirust agent was calcium petroleum sulfonate; the thickening agent was dodecahydroxyl stearic acid; and the saponifying agent was lithium hydroxide monohydrate.

In another aspect, this example also provided a method for preparing the lithium-based grease, the method included the steps of:

(1) mixing a part of base oil with a thickening agent, and heating to a temperature of 100° C., so as to obtain a mixture;

(2) mixing a saponifying agent with water uniformly to obtain an aqueous solution, with the weight ratio of the saponifying agent to water being 1:5;

(3) adding the aforementioned aqueous solution into the mixture of step (1) to carry out a saponification reaction at a temperature of 80° C. for 0.2 hours, heating to 200° C. after the reaction, adding the rest of the base oil, cooling to 100° C., adding an antiwear agent, an antirust agent, an antioxidant, a lubricant, and a hydroxyl-compound-containing modified graphene; and (4) pouring the product obtained from step (3) into a stainless-steel cup, cooling to room temperature, and grinding with a three-roller machine to obtain the lithium-based grease;

wherein the weight ratio of the part of the base oil to the rest of the base oil was 3:1.

Example 2

Example 2 provided a lithium-based grease, and the raw materials for preparing the lithium-based grease included: 0.001 parts of hydroxyl-compound-containing modified graphene, 75 parts of base oil, 0.5 parts of antiwear agent, 0.1 parts of antirust agent, 0.1 parts of antioxidant, 5 parts of lubricant, 5 parts of thickening agent and 0.6 parts of saponifying agent.

The antiwear agent was zinc dialkyldithiophosphate; the antioxidant was a composition of 2,6-di-tert-butyl-p-cresol and alkyl diphenylamine at a corresponding weight ratio of 2:3; the lubricant was methyl oleate; the antirust agent was calcium petroleum sulfonate; the thickening agent was dodecahydroxyl stearic acid; and the saponifying agent was lithium hydroxide monohydrate.

The method for preparing the hydroxyl-compound-containing modified graphene was the same as that of Example 1.

In another aspect, this example also provided a method for preparing the lithium-based grease, which was the same as that of Example 1.

Example 3

Example 3 provided a lithium-based grease, and the raw materials for preparing the lithium-based grease included: 0.3 parts of hydroxyl-compound-containing modified graphene, 78 parts of base oil, 1.0 part of an antiwear agent, 0.8 parts of antirust agent, 0.5 parts of antioxidant, 17 parts of lubricant, 8 parts of thickening agent and 1.2 parts of saponifying agent.

The antiwear agent was zinc dialkyldithiophosphate; the antioxidant was a composition of 2,6-di-tert-butyl-p-cresol and alkyl diphenylamine at a corresponding weight ratio of 2:3; the lubricant was methyl oleate; the antirust agent was calcium petroleum sulfonate; the thickening agent was dodecahydroxyl stearic acid; and the saponifying agent was lithium hydroxide monohydrate.

The method for preparing the hydroxyl-compound-containing modified graphene was the same as that of Example 1.

In another aspect, this example also provided a method for preparing the lithium-based grease, which was the same as that of Example 1.

Example 4

Example 4 provided a lithium-based grease, and the raw materials for preparing the lithium-based grease included: 1.0 part of a hydroxyl-compound-containing modified graphene, 83 parts of base oil, 2.0 parts of antiwear agent, 1.4 parts of antirust agent, 1.2 parts of antioxidant, 22 parts of lubricant, 13 parts of thickening agent and 1.8 parts of saponifying agent.

The antiwear agent was zinc dialkyldithiophosphate; the antioxidant was a composition of 2,6-di-tert-butyl-p-cresol and alkyl diphenylamine at a corresponding weight ratio of 2:3; the lubricant was methyl oleate; the antirust agent was calcium petroleum sulfonate; the thickening agent was dodecahydroxyl stearic acid; and the saponifying agent was lithium hydroxide monohydrate.

The method for preparing the hydroxyl-compound-containing modified graphene was the same as that of Example 1.

In another aspect, this example also provided a method for preparing the lithium-based grease, which was the same as that of Example 1.

Example 5

Example 5 provided a lithium-based grease, and the raw materials for preparing the lithium-based grease included: 1.5 parts of hydroxyl-compound-containing modified graphene, 88 parts of base oil, 2.5 parts of antiwear agent, 1.5 parts of antirust agent, 1.5 parts of antioxidant, 25 parts of lubricant, 15 parts of thickening agent and 2.0 parts of saponifying agent.

The antiwear agent was zinc dialkyldithiophosphate; the antioxidant was a composition of 2,6-di-tert-butyl-p-cresol and alkyl diphenylamine at a corresponding weight ratio of 2:3; the lubricant was methyl oleate; the antirust agent was calcium petroleum sulfonate; the thickening agent was dodecahydroxyl stearic acid; and the saponifying agent was lithium hydroxide monohydrate.

The method for preparing the hydroxyl-compound-containing modified graphene was the same as that of Example 1.

In another aspect, this example also provided a method for preparing the lithium-based grease, which was the same as that of Example 1.

Example 6

Example 6 provided a lithium-based grease, and the raw materials for preparing the lithium-based grease included:

0.5 parts of hydroxyl-compound-containing modified graphene, 80 parts of base oil, 0.5 parts of antiwear agent, 1.2 parts of antirust agent, 0.8 parts of antioxidant, 18 parts of lubricant, 10 parts of thickening agent and 1.4 parts of saponifying agent.

The method for preparing the hydroxyl-compound-containing modified graphene was as follows:

S01. 1 kg of flake graphite powder (with a particle size greater than 400 mesh, and a carbon content greater than 95%) was added into 70 kg of concentrated sulfuric acid (with a mass fraction of 95%-98%); then respectively added with 0.5 kg of sodium peroxide and 0.5 kg of sodium nitrate based on 1 kg of the flake graphite powder at 0-10° C., and stirred for 2 h; slowly added with 100 kg of water based on 1 kg of the flake graphite powder at a temperature controlled at 80-95° C., and stirred for 1 h; centrifuged at 7,200 rpm for more than 0.5 h to realize solid-liquid separation; washed with warm water at 50-60° C., as long as the pH value of the water after washing was greater than 6.5; dried at a low temperature of 0-10° C. until the water content was less than 1%, and then sieved through a 400-mesh sieve to obtain the screen underflow as graphene oxide powder. A mixed gas of helium and nitrogen at a volume ratio of 1:1 was flowed through the constant temperature chamber for 30 min until air was exhausted from the whole space of the constant temperature chamber, then heated to 300° C. until the temperature was constant, the graphene oxide powder was introduced into the chamber, and subjected to heat treatment for 50 min to obtain a hydroxylated graphene.

S02. 30 g of the hydroxylated graphene and 10 g of 2-hydroxyphenyl[3-(trimethoxysilyl)propoxy]phenyl ketone (CAS No.: 94279-22-8) were added into a solvent ethanol, and added with a small amount of water to react for at 50° C. for 24 h, suction-filtered, washed, dried under vacuum to obtain a hydroxyl-compound-containing modified graphene;

The antiwear agent was zinc dialkyldithiophosphate; the antioxidant was a composition of 2,6-di-tert-butyl-p-cresol and alkyl diphenylamine at a corresponding weight ratio of 2:3; the lubricant was methyl oleate; the antirust agent was calcium petroleum sulfonate; the thickening agent was dodecahydroxyl stearic acid; and the saponifying agent was lithium hydroxide monohydrate.

In another aspect, this example also provided a method for preparing the lithium-based grease, which was the same as that of Example 1.

Example 7

Example 7 provided a lithium-based grease, and the raw materials for preparing the lithium-based grease included: 0.5 parts of modified graphene, 80 parts of base oil, 1.5 parts of antiwear agent, 1.2 parts of antirust agent, 0.8 parts of antioxidant, 18 parts of lubricant, 10 parts of thickening agent and 1.4 parts of saponifying agent.

A method for preparing the modified graphene was as follows:

S01. 1 kg of flake graphite powder (with a particle size greater than 400 mesh, and a carbon content greater than 95%) was added into 70 kg of concentrated sulfuric acid (with a mass fraction of 95%-98%); then respectively added with 0.5 kg of sodium peroxide and 0.5 kg of sodium nitrate based on 1 kg of the flake graphite powder at 0-10° C., and stirred for 2 h; slowly added with 100 kg of water based on 1 kg of the flake graphite powder at a temperature controlled at 80-95° C., and stirred for 1 h; centrifuged at 7,200 rpm for more than 0.5 h to realize solid-liquid separation; washed with warm water at 50-60° C., as long as the pH value of the water after washing was greater than 6.5; dried at a low temperature of 0-10° C. until the water content was less than 1%, and then sieved through a 400-mesh sieve to obtain the screen underflow as graphene oxide powder. A mixed gas composed of helium and nitrogen at a volume ratio of 1:1 was flowed through the constant temperature chamber for 30 min until air was exhausted from the whole space of the constant temperature chamber, then heated to 300° C. until the temperature was constant, the graphene oxide powder was introduced into the chamber, and subjected to heat treatment for 50 min to obtain a hydroxylated graphene;

S02. 30 g of the hydroxylated graphene and 10 g of 7-(2-hydroxyethyl)-3,3-di methoxy-10-[3-(trimethoxysilyl)propyl]-2-oxa-7,10-diaza-3-siladodecan-12-ol (CAS No.: 214362-07-9) were added into a solvent ethanol, and added with a small amount of water to react at 50° C. for 24 h, suction-filtered, washed, dried under vacuum to obtain a modified hydroxylated graphene;

S03. the modified hydroxylated graphene prepared by S02 was reacted with 1,4-dichloromethoxybutane, to chloromethylate the resultant modified hydroxylated graphene to obtain a chloromethylated modified hydroxylated graphene; and S04. 1 g of the chloromethylated modified hydroxylated graphene was added into a reactor, then added with 30 mL of a solvent chloroform and 5 mL of triethylamine to carry out a quaternization reaction at a constant temperature (60° C.). After the end of the reaction, a product was washed successively with 1,4-dioxane and ethanol, and dried under vacuum to obtain a modified graphene.

The antiwear agent was zinc dialkyldithiophosphate; the antioxidant was a composition of 2,6-di-tert-butyl-p-cresol and alkyl diphenylamine at a corresponding weight ratio of 2:3; the lubricant was methyl oleate; the antirust agent was calcium petroleum sulfonate; the thickening agent was dodecahydroxyl stearic acid; and the saponifying agent was lithium hydroxide monohydrate.

In another aspect, this example also provided a method for preparing the lithium-based grease, the method included the steps of:

(1) mixing a part of base oil with a thickening agent, and heating to a temperature of 100° C., so as to obtain a mixture;

(2) mixing a saponifying agent with water uniformly to obtain an aqueous solution, with the weight ratio of the saponifying agent to water being 1:5;

(3) adding the aforementioned aqueous solution into the mixture of step (1) to carry out a saponification reaction at a temperature of 80° C. for 0.2 hours, heating to 200° C. after the reaction, adding the rest of the base oil, cooling to 100° C., adding an antiwear agent, an antirust agent, an antioxidant, an lubricant, and a modified graphene; and (4) pouring the product obtained from step (3) into a stainless-steel cup, cooling to room temperature, and grinding with a three-roller machine to obtain the lithium-based grease;

wherein the weight ratio of the part of the base oil to the rest of the base oil was 3:1.

Example 8

Example 8 provided a lithium-based grease, and the raw materials for preparing the lithium-based grease included: 0.5 parts of graphene material, 80 parts of base oil, 1.5 parts of antiwear agent, 1.2 parts of antirust agent, 0.8 parts of antioxidant, 18 parts of lubricant, 10 parts of thickening agent and 1.4 parts of saponifying agent.

The method for preparing the graphene material was as follows:

S01. 1 kg of flake graphite powder (with a particle size greater than 400 mesh, and a carbon content greater than 95%) was added into 70 kg of concentrated sulfuric acid (with a mass fraction of 95%-98%); then respectively added with 0.5 kg of sodium peroxide and 0.5 kg of sodium nitrate based on 1 kg of the flake graphite powder at 0-10° C., and stirred for 2 h; slowly added with 100 kg of water based on 1 kg of the flake graphite powder at a temperature controlled at 80-95° C., and stirred for 1 h; centrifuged at 7,200 rpm for more than 0.5 h to realize solid-liquid separation; washed with warm water at 50-60° C., as long as the pH value of the water after washing was greater than 6.5; dried at a low temperature of 0-10° C. until the water content was less than 1%, and then sieved through a 400-mesh sieve to obtain the screen underflow as graphene oxide.

0.1 g of the graphene oxide prepared above was added into 100 ml of water for ultrasonic dispersion (with a ultrasonic frequency of 30 kHz) for 30 min, then added into 5 ml of hydrazine hydrate (with a mass concentration of 85%), heated in an oil bath at 100° C. and reacted for 24 h, and the finally obtained black flocculent precipitate was washed with water, suction-filtered and dried to obtain powder as the graphene material.

The antiwear agent was zinc dialkyldithiophosphate; the antioxidant was a composition of 2,6-di-tert-butyl-p-cresol and alkyl diphenylamine at a corresponding weight ratio of 2:3; the lubricant was methyl oleate; the antirust agent was calcium petroleum sulfonate; the thickening agent was dodecahydroxyl stearic acid; and the saponifying agent was lithium hydroxide monohydrate.

In another aspect, this example also provided a method for preparing the lithium-based grease, the method included the steps of:

(1) mixing a part of base oil with a thickening agent, and heating to a temperature of 100° C., so as to obtain a mixture;

(2) mixing a saponifying agent with water uniformly to obtain an aqueous solution, with the weight ratio of the saponifying agent to water being 1:5;

(3) adding the aforementioned aqueous solution into the mixture of step (1) to carry out a saponification reaction at a temperature of 80° C. for 0.2 hours, heating to 200° C. after the reaction, adding the rest of the base oil, cooling to 100° C., adding an antiwear agent, an antirust agent, an antioxidant, a lubricant, and a graphene material; and (4) pouring the product obtained from step (3) into a stainless-steel cup, cooling to room temperature, and grinding with a three-roller machine to obtain the lithium-based grease;

wherein the weight ratio of the part of the base oil to the rest of the base oil was 3:1.

Example 9

Example 9 provided a lithium-based grease containing a hydroxyl-compound-containing modified graphene, and the raw materials for preparing the lithium-based grease included: 0.5 parts of hydroxyl-compound-containing modified graphene, 80 parts of base oil, 1.5 parts of antiwear agent, 1.2 parts of antirust agent, 0.8 parts of antioxidant, 18 parts of lubricant, 10 parts of thickening agent and 1.4 parts of saponifying agent.

The method for preparing the hydroxyl-compound-containing modified graphene was as follows:

S01. 1 kg of flake graphite powder (with a particle size greater than 400 mesh, and a carbon content greater than 95%) was added into 70 kg of concentrated sulfuric acid (with a mass fraction of 95%-98%); then respectively added with 0.5 kg of sodium peroxide and 0.5 kg of sodium nitrate based on 1 kg of the flake graphite powder at 0-10° C., and stirred for 2 h; slowly added with 100 kg of water based on 1 kg of the flake graphite powder at a temperature controlled at 80-95° C., and stirred for 1 h; centrifuged at 7,200 rpm for more than 0.5 h to realize solid-liquid separation; washed with warm water at 50-60° C., as long as the pH value of the water after washing was greater than 6.5; dried at a low temperature of 0-10° C. until the water content was less than 1%, and then sieved through a 400-mesh sieve to obtain the screen underflow as graphene oxide powder. A mixed gas composed of helium and nitrogen at a volume ratio of 1:1 was flowed through the constant temperature chamber for 30 min until air was exhausted from the whole space of the constant temperature chamber, then heated to 300° C. until the temperature was constant, the graphene oxide powder was introduced into the chamber, and subjected to heat treatment for 50 min to obtain a hydroxylated graphene;

S02. 30 g of the hydroxylated graphene and 10 g of 2-hydroxyphenyl[3-(trimethoxysilyl)propoxy]phenyl ketone (CAS No.: 94279-22-8) were added into a solvent ethanol, and added with a small amount of water to react for at 50° C. for 24 h, suction-filtered, washed, dried under vacuum to obtain a modified hydroxylated graphene;

S03. the modified hydroxylated graphene prepared by S02 was reacted with 1,4-dichloromethoxybutane, to chloromethylate the resultant modified hydroxylated graphene to obtain a chloromethylated modified hydroxylated graphene; and S04. 1 g of the chloromethylated modified hydroxylated graphene was added into a reactor, then added with 30 mL of a solvent chloroform and 5 mL of triethylamine to carry out a quaternization reaction at a constant temperature (60° C.). After the end of the reaction, a product was washed successively with 1,4-dioxane and ethanol, and dried under vacuum to obtain a hydroxyl-compound-modified graphene.

The antiwear agent was triphenyl thiophosphate; the antioxidant was a composition of 2,6-di-tert-butyl-p-cresol and alkyl diphenylamine at a corresponding weight ratio of 2:3; the lubricant was methyl oleate; the antirust agent was calcium petroleum sulfonate; the thickening agent was dodecahydroxyl stearic acid; and the saponifying agent was lithium hydroxide monohydrate.

In another aspect, this example also provided a method for preparing the lithium-based grease containing the hydroxyl-compound-modified graphene, which was the same as that of Example 1.

Example 10

Example 10 provided a lithium-based grease containing a hydroxyl-compound-containing modified graphene, and the raw materials for preparing the lithium-based grease included: 0.5 parts of hydroxyl-compound-containing modified graphene, 80 parts of base oil, 1.5 parts of antiwear agent, 1.2 parts of antirust agent, 0.8 parts of antioxidant, 18 parts of lubricant, 10 parts of thickening agent and 1.4 parts of saponifying agent.

The method for preparing the hydroxyl-compound-containing modified graphene was as follows:

S01. 1 kg of flake graphite powder (with a particle size greater than 400 mesh, and a carbon content greater than 95%) was added into 70 kg of concentrated sulfuric acid (with a mass fraction of 95%-98%); then respectively added with 0.5 kg of sodium peroxide and 0.5 kg of sodium nitrate based on 1 kg of the flake graphite powder at 0-10° C., and stirred for 2 h; slowly added with 100 kg of water based on 1 kg of the flake graphite powder at a temperature controlled at 80-95° C., and stirred for 1 h; centrifuged at 7,200 rpm for more than 0.5 h to realize solid-liquid separation; washed with warm water at 50-60° C., as long as the pH value of the water after washing was greater than 6.5; dried at a low temperature of 0-10° C. until the water content was less than 1%, and then sieved through a 400-mesh sieve to obtain the screen underflow as graphene oxide powder. A mixed gas composed of helium and nitrogen at a volume ratio of 1:1 was flowed through the constant temperature chamber for 30 min until air was exhausted from the whole space of the constant temperature chamber, then heated to 300° C. until the temperature was constant, the graphene oxide powder was introduced into the chamber, and subjected to heat treatment for 50 min to obtain a hydroxylated graphene;

S02. 30 g of the hydroxylated graphene and 10 g of 2-hydroxyphenyl[3-(trimethoxysilyl)propoxy]phenyl ketone (CAS No.: 94279-22-8) were added into a solvent ethanol, and added with a small amount of water to react for at 50° C. for 24 h, suction-filtered, washed, dried under vacuum to obtain a modified hydroxylated graphene;

S03. the modified hydroxylated graphene prepared by S02 was reacted with 1,4-dichloromethoxybutane, to chloromethylate the resultant modified hydroxylated graphene to obtain a chloromethylated modified hydroxylated graphene; and S04. 1 g of the chloromethylated modified hydroxylated graphene was added into a reactor, then added with 30 mL of a solvent chloroform and 5 mL of triethylamine to carry out a quaternization reaction at a constant temperature (60° C.). After the end of the reaction, a product was washed successively with 1,4-dioxane and ethanol, and dried under vacuum to obtain a hydroxyl-compound-containing modified graphene.

The antiwear agent was triphenyl thiophosphate; the antioxidant was a composition of 2,6-di-tert-butyl-p-cresol and alkyl diphenylamine at a corresponding weight ratio of 2:3; the lubricant was polytetrafluoroethylene; the antirust agent was calcium petroleum sulfonate; the thickening agent was dodecahydroxyl stearic acid; and the saponifying agent was lithium hydroxide monohydrate.

In another aspect, this example also provided a method for preparing the lithium-based grease containing the hydroxyl-compound-modified graphene, which was the same as that of Example 1.

Example 11

Example 11 provided a lithium-based grease, and the raw materials for preparing the lithium-based grease included: 0.1 part of a graphene material, 0.4 parts of hydroxyl-compound-containing modified graphene, 80 parts of base oil, 1.5 parts of antiwear agent, 1.2 parts of antirust agent, 0.8 parts of antioxidant, 18 parts of lubricant, 10 parts of thickening agent and 1.4 parts of saponifying agent.

The method for preparing the hydroxyl-compound-containing modified graphene was the same as that of Example 1; and the method for preparing the graphene material was the same as that of Example 8.

The antiwear agent was zinc dialkyldithiophosphate; the antioxidant was a composition of 2,6-di-tert-butyl-p-cresol and alkyl diphenylamine at a corresponding weight ratio of 2:3; the lubricant was methyl oleate; the antirust agent was calcium petroleum sulfonate; the thickening agent was dodecahydroxyl stearic acid; and the saponifying agent was lithium hydroxide monohydrate.

In another aspect, this example also provided a method for preparing the lithium-based grease, the method included the steps of:

(1) mixing a part of base oil with a thickening agent, and heating to a temperature of 100° C., so as to obtain a mixture;

(2) mixing a saponifying agent with water uniformly to obtain an aqueous solution, with the weight ratio of the saponifying agent to water being 1:5;

(3) adding the aforementioned aqueous solution into the mixture of step (1) to carry out a saponification reaction at a temperature of 80° C. for 0.2 hours, heating to 200° C. after the reaction, adding the rest of the base oil, cooling to 100° C., adding an antiwear agent, an antirust agent, an antioxidant, an lubricant, and a hydroxyl-compound-containing modified graphene; and (4) pouring the product obtained from step (3) into a stainless-steel cup, cooling to room temperature, and grinding with a three-roller machine to obtain the lithium-based grease;

wherein the weight ratio of the part of the base oil to the rest of the base oil was 3:1.

Example 12

Example 12 provided a lithium-based grease, and the raw materials for preparing the lithium-based grease included: 80 parts of base oil, 1.5 parts of antiwear agent, 1.2 parts of antirust agent, 0.8 parts of antioxidant, 18 parts of lubricant, 10 parts of thickening agent and 1.4 parts of saponifying agent.

The antiwear agent was zinc dialkyldithiophosphate; the antioxidant was a composition of 2,6-di-tert-butyl-p-cresol and alkyl diphenylamine at a corresponding weight ratio of 2:3; the lubricant was methyl oleate; the antirust agent was calcium petroleum sulfonate; the thickening agent was dodecahydroxyl stearic acid; and the saponifying agent was lithium hydroxide monohydrate.

In another aspect, this example also provided a method for preparing the lithium-based grease, the method included the steps of:

(1) mixing a part of base oil with a thickening agent, and heating to a temperature of 100° C., so as to obtain a mixture;

(2) mixing a saponifying agent with water uniformly to obtain an aqueous solution, with the weight ratio of the saponifying agent to water being 1:5;

(3) adding the aforementioned aqueous solution into the mixture of step (1) to carry out a saponification reaction at a temperature of 80° C. for 0.2 hours, heating to 200° C. after the reaction, adding the rest of the base oil, cooling to 100° C., adding an antiwear agent, an antirust agent, an antioxidant, and an lubricant; and (4) pouring the product obtained from step (3) into a stainless-steel cup, cooling to room temperature, and grinding with a three-roller machine to obtain the lithium-based grease;

wherein the weight ratio of the part of the base oil to the rest of the base oil was 3:1.

Example 13

Example 13 provides a lithium-based grease, and the raw materials for preparing the lithium-based grease included: 0.5 parts of graphene materials, 80 parts of base oil, 2.5 parts of antiwear agent, 1.2 parts of antirust agent, 0.8 parts of antioxidant, 18 parts of lubricant, 10 parts of thickening agent and 1.4 parts of saponifying agent.

The method for preparing graphene materials was as follows:

To 10 g of the hydroxyl-compound-containing modified graphene hydrogen form 10 g (PKS-1) 100 ml of ion-exchange resin is immersed in a potassium hydroxide solution (concentration 5 M) is cleaned after 10 hours, 100 ml of the washed resin is immersed in a hydrochloric acid solution (5 M concentration) after 10 hours, washing, the resulting standby; and the 0.08 µM of nickel acetate dissolved in deionized water, a concentration of 0.02 mol/L is formed of a nickel metal ion salt solution was added 10 g of the back-up hydrogen form (PKS-1) ion-exchange resin, a magnetic stirring the mixture, the ion exchange resin adsorption metallic nickel, metallic nickel is then rinsed with deionized water after adsorption of the ion exchange resin, after washing the resin thus obtained was 10 g, 10 g potassium hydroxide aqueous solution of potassium hydroxide was added to a pore-forming agent, stir drying, pulverization, sensitized to be carried out;

And the step (1)—sensitized treated feedstock temperature was maintained at 98° C. to a water content less than 2%;

After drying the resulting material was subjected to a high temperature of the step (2) lysis treatment, i.e. after drying the resulting product is placed in the step (2) in a tube furnace, under a nitrogen flow rate was 60 ml/min under a protective gas, at a heating rate of 5° C./min from room temperature to 100° C., and then raised to 450° C. to 2° C./min, and then raised to 850° C. at 5° C./min, and the temperature for 2 h at 850° C.;

After the step (3) pyrolysis of the resulting materials are added to excess water to effect disintegration;

With the resulting material after the step (4) of disintegration 3 mol/L of hydrochloric acid for 2 h, washed with deionized water filter to the filtrate was neutral pH of, filtered (metal recovery), in the filter residue is dried at 80° C., three-dimensional structure of the graphene powder to obtain a multi-stage hole structure.

The antiwear agent was a composition of zinc dialkyldithiophosphate and chlorinated paraffin at a corresponding weight ratio of 2:3; the antioxidant was a composition of 2,6-di-tert-butyl-p-cresol and alkyl diphenylamine at a corresponding weight ratio of 2:3; the lubricant was methyl oleate; the antirust agent was calcium petroleum sulfonate; the thickening agent was dodecahydroxyl stearic acid; and the saponifying agent was lithium hydroxide monohydrate.

Evaluation of Performances

1. Stability Test

The graphene or graphene materials of Examples 1 and 6-8 were tested for stability. Test method: 1 mg of the graphene or graphene material was added into and evenly dispersed in 1,000 ml of the base oil to obtain a dispersed solution, where the base oil was the base oil used in Example 1. After the dispersed solution was centrifuged at 6,000 rpm for 0.5 h, whether graphene precipitation or sedimentation occurred was observed by naked eyes. The results were shown in Table 1.

2. Whether Stratification Occurred after Saponification for 12 Minutes

The saponification reactions in the preparation processes of the lithium-based grease of Examples 1-12 were observed by naked eyes after 12 minutes of the reaction, and the results were shown in Table 1.

3. Test of Extreme-Pressure Antiwear Property and Oxidation Resistance

The lithium-based greases prepared in Examples 1-12 were tested for their extreme-pressure antiwear property and oxidation resistance. The friction coefficient was measured by SH/T0847, and the oxidation stability was measured by SH/T0325. The results were shown in Table 1.

4. Test of High-Temperature Resistance and Colloidal Properties

The lithium-based greases prepared in Examples 1-11 were tested for dropping points and water leaching losses. The dropping point was measured by GB/T 4929, and the water leaching loss was measured by SH/T 0109 method. The results were shown in table 1.

TABLE 1

Performance Comparison of Greases of Various Examples

| | Oxidation stability (99° C., 100 h, 760 kPa) pressure drop/kPa, not greater | Friction Coefficient | Dropping Point | Water Leaching Loss (38° C., 1 h) Mass Fraction/% not greater than | Whether stratification occurred after saponification for 12 minutes | Stability |
|---|---|---|---|---|---|---|
| Example 1 | 4 | 0.07 | 231 | 0.80% | No | No precipitation or sedimentation |
| Example 2 | 5 | 0.09 | 235 | 0.87% | No | / |
| Example 3 | 6 | 0.08 | 237 | 0.88% | No | / |
| Example 4 | 7 | 0.09 | 235 | 0.87% | No | / |
| Example 5 | 8.3 | 0.09 | 239 | 0.92% | No | / |
| Example 6 | 10 | 0.10 | 212 | 1.83% | Yes | Precipitation or sedimentation |
| Example 7 | 11 | 0.11 | 210 | 1.76% | No | Precipitation or sedimentation |
| Example 8 | 12 | 0.12 | 215 | 1.95% | Yes | Precipitation or sedimentation |

TABLE 1-continued

Performance Comparison of Greases of Various Examples

|  | Oxidation stability (99° C., 100 h, 760 kPa) pressure drop/kPa, not greater | Friction Coefficient | Dropping Point | Water Leaching Loss (38° C., 1 h) Mass Fraction/% not greater than | Whether stratification occurred after saponification for 12 minutes | Stability |
|---|---|---|---|---|---|---|
| Example 9 | 22 | 0.15 | 203 | 2.13% | No | / |
| Example 10 | 15 | 0.14 | 207 | 2.13% | No | / |
| Example 11 | 8 | 0.09 | 218 | 1.78% | No | / |
| Example 12 | 20 | 0.15 | 205 | 2.48% | Yes | / |
| Example 13 | 4 | 0.07 | 250 | 0.80% | No | / |

The lithium-based grease of the present invention has the advantages of improved dropping point, reduced water leaching loss, and improved oxidation resistance. From this, it can be seen that in the present invention the grease has improved colloid performance and oxidation resistance, and has excellent high-temperature resistance.

The foregoing embodiments are merely illustrative, and serve to explain some features of the method of the present invention. The appended claims are intended to claim the broadest possible scope that can be envisaged, and the embodiments presented herein are merely illustrative of implementations selected based on combinations of all possible embodiments. Therefore, it is the intention of the applicant that the appended claims are not limited by the choice of examples illustrating the features of the present invention. Some numerical ranges used in the claims also include subranges within them, and changes in these ranges should also be interpreted as being covered by the appended claims where possible.

The invention claimed is:

1. A lithium-based grease, characterized in that, raw materials for preparing the lithium-based grease comprise in parts by weight:
    75-88 parts of base oil,
    0.5-2.5 parts of antiwear agent,
    0.1-1.5 parts of antirust agent,
    0.1-1.5 parts of antioxidant,
    5-25 parts of lubricant,
    5-15 parts of thickening agent,
    0.6-2.0 parts of saponifying agent, and
    0.001-1.5 parts of hydroxyl compound-containing modified graphene containing a quaternary ammonium salt.

2. The lithium-based grease according to claim 1, characterized in that, the hydroxyl compound-containing modified graphene is a hydroxyl compound-containing modified graphene containing an aromatic ring.

3. The lithium-based grease according to claim 2, characterized in that, the hydroxyl compound-containing modified graphene containing an aromatic ring is a phenol-modified graphene.

4. The lithium-based grease according to claim 1, characterized in that, the antiwear agent is selected from at least one of zinc dialkyldithiophosphate, molybdenum dithiodialkylcarbamate, lead dithiodialkylcarbamate, triphenyl thiophosphate, organomolybdenum complex, sulfurized olefin, molybdenum disulfide, polytetrafluoroethylene, molybdenum thiophosphate, chlorinated paraffin, antimony dibutyl-dithiocarbamate, tungsten disulfide, selenium disulfide, graphite fluoride, calcium carbonate and zinc oxide.

5. A method for preparing the hydroxyl compound-containing modified graphene containing a quaternary ammonium salt according to claim 1, characterized in that, the method comprises the steps of:
    (1) contacting a carbon source with concentrated sulfuric acid (having a mass fraction of 95%-98%), wherein the carbon source has a carbon content greater than 95%;
    (2) adding a metal peroxide to a mixture obtained from step (1), wherein the metal peroxide is an alkali earth metal peroxide $X_2O_2$, wherein X is Li, Na, K or Rb or an alkaline earth metal peroxide $YO_2$, wherein Y is Ca, Ba, Mg or Sr, at a temperature of 0-10° C.;
    (3) separating a solid fraction obtained from step (2) from a liquid phase;
    (4) heating the solid fraction obtained from step (3) in an inert gas atmosphere to a constant temperature of 280 to 350° C. to obtain hydroxylated graphene;
    (5) reacting the hydroxylated graphene of step (4) with 2-hydroxyphenyl[3-(trimethoxysilyl)propoxy]phenyl ketone to obtain a modified hydroxylated graphene;
    (6) reacting the modified hydroxylated graphene of step (5) with a chloroalkyl ether to chloromethylate the modified hydroxylated graphene to obtain a chloromethylated modified hydroxylated graphene; and
    (7) reacting the chloromethylated modified hydroxylated graphene of step (6) with $N(C_1\text{-}4alkyl)3$ to carry out a quaternization reaction to produce the hydroxyl compound-containing modified graphene containing a quaternary ammonium salt.

6. A method for preparing the lithium-based grease according to claim 1, characterized in that, the method comprises the steps of:
    (1) mixing the base oil with the thickening agent, and heating-up to 80-105° C., so as to obtain a mixture;
    (2) mixing the saponifying agent with water uniformly to obtain an aqueous solution, with a weight ratio of the saponifying agent to water being in a range of from 1:4 to 1:6;
    (3) adding the aqueous solution into the mixture of step (1) to carry out a saponification reaction at a temperature of 80-95° C. for 0.2-1.5 hours, and heating-up to 190-220° C. after the saponification reaction,
    (4) after step (3), cooling to 100-120° C., and adding the antiwear agent, the antirust agent, the antioxidant, the hydroxyl compound containing modified graphene containing a quaternary ammonium salt, and the lubricant; and
    (5) pouring a product obtained from step (4) into a stainless steel cup, cooling to room temperature, and grinding to obtain the lithium-based grease.

7. The method according to claim 6, wherein a graphene material is added in step (4) while adding the antiwear agent, the antirust agent, the antioxidant, and the lubricant.

* * * * *